United States Patent [19]

Scobie et al.

[11] Patent Number: 4,846,225

[45] Date of Patent: Jul. 11, 1989

[54] TRANSMISSION ASSEMBLY FOR USE WITH DOUBLE BLOCK AND BLEED SYSTEM

[75] Inventors: William B. Scobie, Houston; Daniel P. Kusmer, Stafford, both of Tex.

[73] Assignee: Keystone International, Inc., Houston, Tex.

[21] Appl. No.: 246,258

[22] Filed: Sep. 19, 1988

[51] Int. Cl.[4] ............................................. F16K 11/14
[52] U.S. Cl. .................................. 137/862; 137/637.1
[58] Field of Search ............ 137/240, 862, 865, 614.11, 137/614.13, 637, 637.1, 630.2

[56] References Cited

U.S. PATENT DOCUMENTS 3,007,489 11/1961 Biddle ........................ 137/614.11 X
3,528,447 9/1970 Kolb ................................... 137/240
4,385,641 5/1983 Albertin et al. ................. 137/887 X

*Primary Examiner*—A. Michael Chambers
*Assistant Examiner*—John C. Fox
*Attorney, Agent, or Firm*—Browning, Bushman, Zamecki & Anderson

[57] ABSTRACT

A transmission assembly for operating a double block and bleed valve system having a first block valve with a first valve shaft, a second block valve with a second valve shaft and a bleed valve disposed between the first and second block valves, the transmission assembly comprising a cam assembly having a cam plate journaled for rotation about a fixed axis, a first link member interconnecting the cam assembly and the first shaft for effecting rotation of the first shaft in response to rotation of the cam plate, a second link member interconnecting the cam assembly and the second shaft for effecting rotation of the second shaft in response to rotation of the cam plate, said first link member being operative to effect initial rotation of the first shaft from a first position in response to rotation of said cam plate, said second link member being operative to effect initial rotation of said second shaft from a first position in response to further rotation of said cam plate after said initial rotation of said first shaft, said first and second link members being operative to rotate the first and second shafts, respectively, to a terminal second position in response to further rotation of the cam plate.

15 Claims, 11 Drawing Sheets

TRANSMISSION ASSEMBLY FOR USE WITH DOUBLE BLOCK AND BLEED SYSTEM

BACKGROUND OF THE INVENTION

1. Field of the Invention

The present invention relates to a double block and bleed system and, more particularly, to a transmission system for interfacing between an actuating means and a double block and bleed system.

2. Description of the Background

In industries which produce liquid products, particularly beverage industries, such as breweries, soft drink bottlers, dairies, etc., large networks of pipes are used to transfer liquid from one place to another. For a variety of reasons, it is periodically necessary to interrupt liquid flow through a first pipe network while retaining the liquid in a second pipe network normally connected to the first network. Accordingly, valving systems known as double block and bleed are commonly employed.

In a typical double block and bleed system, first and second valves are interconnected by a chamber which is also provided with a bleed valve to drain the chamber, the first and second valves in turn being connectable to respective pipe sections such that the chamber between the valves may be isolated by closure of both of the valves and any material in the chamber may be removed by means of the bleed valve. Additionally, with both of the block valves in the closed position the chamber therebetween can be cleaned with a suitable spray valve in a manner shown as for example in U.S. Pat. No. 4,458,706.

In prior art double block and bleed systems, the block valves are operated by a gear box or transmission assembly which in turn is driven by an actuator which can be manual but which is normally pneumatic or hydraulic. In these prior art systems, both of the block valves are simultaneously opened and closed by the actuator through the transmission assembly. This is disadvantageous because it increases actuator sizing. For example, to open two butterfly valves simultaneously from the fully closed position requires a substantially larger actuator to accommodate the substantially larger initial torque requirements than would be required if the two valves were opened independently.

Moreover, in typical prior art block and bleed systems, the bleed valve requires a separate actuator. The net result is a system requiring multiple and oversized actuators, complex piping and assembly array which is undesirable particularly in piping systems carrying food products where cleanliness is an absolute necessity and bulky, complex systems complicate the problem of achieving cleanliness.

SUMMARY OF THE INVENTION

It is therefore an object of the present invention to provide a transmission assembly for a double block and bleed system which is simple in design and permits the use of smaller actuator sizing.

Another object of the present invention is to provide a transmission assembly for use in a double block and bled system which can utilize a single actuator to sequence operation of the block valves and the bleed valve.

The above and other objects of the present invention will become apparent from the description given herein and the appended claims.

The transmission assembly of the present invention has a cam assembly which includes a cam plate journaled for rotation about a fixed axis. A first means interconnects the cam assembly and the shaft of the first block valve for effecting rotation of the first valve shaft in response to rotation of the cam plate. A second means interconnects the cam assembly and the shaft of the second block valve effecting rotation of the second valve shaft in response to rotation of the cam plate. The first means is operative to effect initial rotation of the first valve shaft from a first position, i.e. fully closed, in response to rotation of the cam plate while the second means is operative to effect initial rotation of the second valve from the first position, i.e. fully closed, in response to further rotation of the cam plate after initial rotation of the first valve shaft. The first and second means are operative to rotate the first and second valve shafts, respectively, to a second position e.g. the fully opened position, in response to further rotation of the cam plate.

DESCRIPTION OF THE PREFERRED EMBODIMENTS

Figure 1:
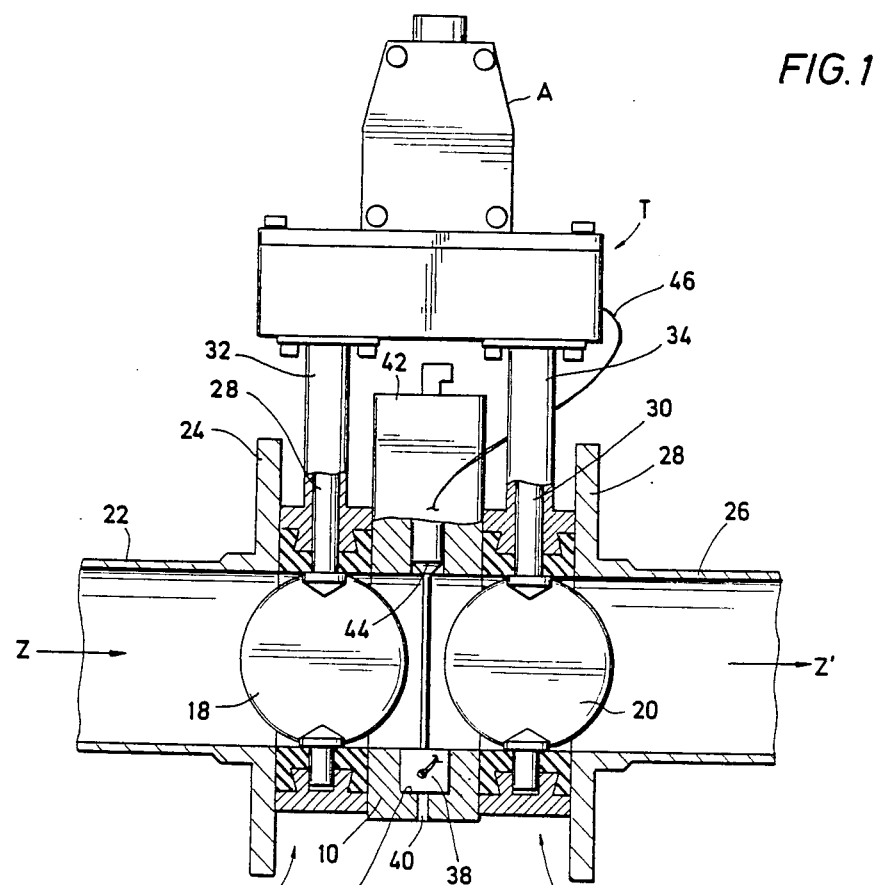
FIG. 1 is an elevational view, partly in section, of a typical double block and bleed system.
Figure 2:
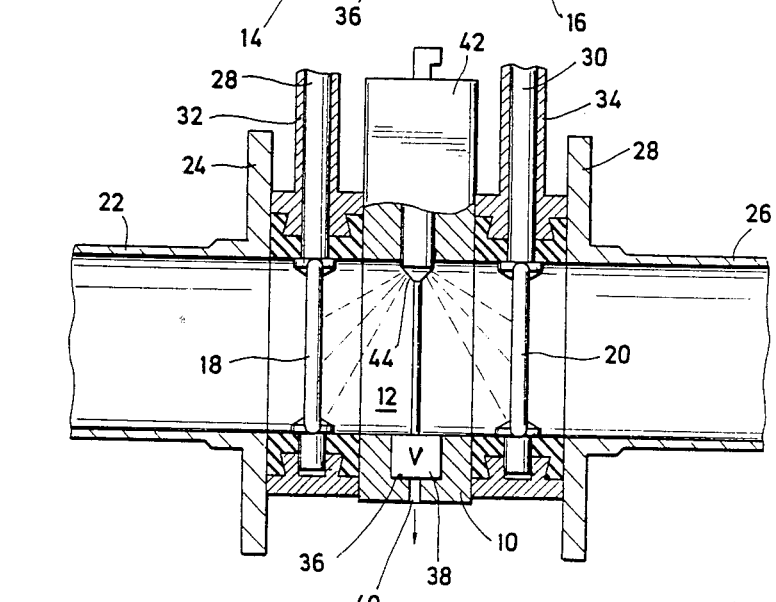
FIG. 2 is a view similar to FIG. 1 showing the bleed valve in the open position and the chamber between the block valves being cleaned by a spray head.

Referring first to FIG. 1 there is shown a double block and bleed system comprising an annular body 10 being disposed between a first block valve shown generally as 14 and a second block valve shown generally as 16, a closed chamber 12 being formed by body 10 and valves 14, 16 when the latter are in the closed position (see FIG. 2). As shown, block valves 14 and 16 are conventional butterfly valves having rotatable disks 18 and 20, respectively, which, as shown in FIG. 1, are in the open position. Valve 14 is connected to a pipe 22 by means of a flange connection 24 while valve 16 is connected to a pipe 26 by means of a flange connection 28. As is well known to those skilled in the art, suitable bolts, not shown, serve to connect flange 24 to flange 28 and hence compress valves 14 and 16 and body 10 therebetween. It will thus be seen, as shown by the arrows Z, Z', that with valves 14, 16 in the open position, material can flow through pipe 22 into chamber 12 and then into pipe 26.

Valve 14 is provided with a rotatable shaft or stem 28 attached to disk 18 for rotation therewith. Likewise, block valve 16 has a rotatable shaft or stem 30 attached to disk 20 for rotation therewith. Shafts 28 and 30 extend through cylindrical neck portions 32 and 34, respectively, of valves 14 and 16, respectively.

Disposed in a cavity 36 of body 10 is a bleed valve 38 (shown schematically) which is of the type that can be operatively moved from a closed (FIG. 1) to an open (FIG. 2) position so as to drain any material from chamber 12 through port 40. Mounted on body 10 is a clean-in-place (CIP) assembly used to introduce a cleaning fluid into chamber 12 when disks 18 and 20 are in the closed position. CIP assembly 42 has a spray head 44 which can be selectively introduced and retracted into chamber 12 (compare FIG. 1 and FIG. 2), whereby the CIP fluid can be introduced into chamber 12 when vavles 14 and 16 are in the closed position (see FIG. 2).

A transmission assembly indicated generally as T is connected to neck portions 32 and 34 of valves 14 and 16, respectively, valve shafts 28 and 30, as will be seen hereafter, extending into transmission assembly T. Mounted on transmission assembly T is an actuator A which can be of any conventional design such as pneumatic, hydraulic, electric, etc., actuator A serving as the driver to open and close valves 14 and 16. It will also be recognized that actuator A can be dispensed with and valves 14 and 16 controlled manually via transmission assembly T. A bowden cable 46 extends from transmission assembly T to bleed valve 38 for a purpose seen hereafter.

As noted above, FIG. 2 shows the block and bleed system when valves 14 and 16 are in the closed position isolating chamber 12 from the flow passages formed by pipes 22 and 26. Accordingly, CIP apparatus 42 can be actuated and a CIP fluid, as shown, introduced into chamber 12 to thoroughly clean the interior thereof. Bleed valve 38 having been moved to the open position, when valves 14 and 16 are closed, the CIP fluid can be drained from chamber 12 via port 40.

Figure 3:
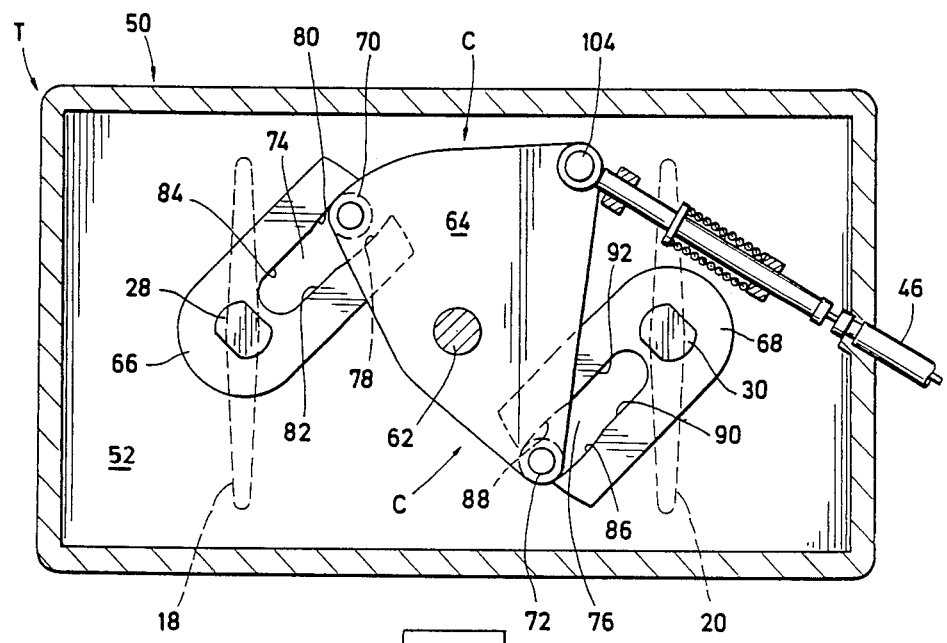
FIG. 3 is a view taken along the lines 3—3 of FIG. 4 showing one embodiment of the transmission assembly of the present invention.
Figure 4:
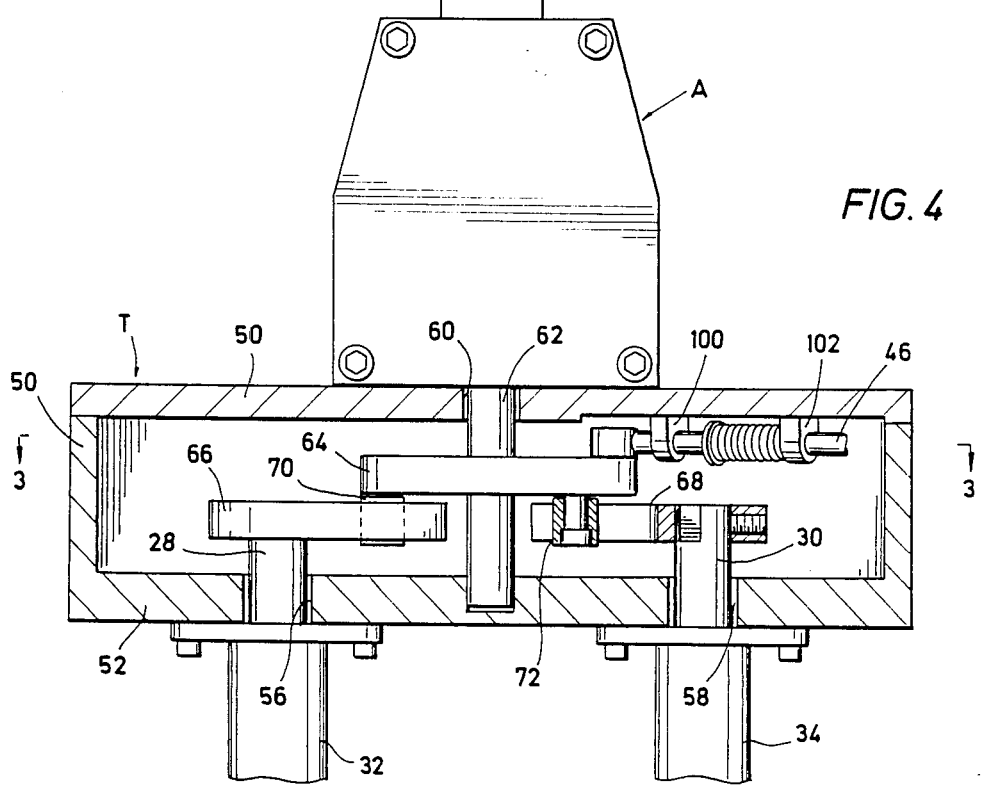
FIG. 4 is an elevational view, partly in section, of one embodiment of the transmission assembly of the present invention.

Referring now to FIGS. 3 and 4, the transmission assembly T has a housing 50 including a bottom wall 52 and a cover plate 54. First valve shaft 28 extends through an opening 56 in bottom wall 52 while second valve shaft 30 extends through an opening 58 in bottom wall 52. A drive shaft 62 from actuator A extends through an opening 60 in cover plate 54 of transmission assembly T. Drive shaft 62 is fixedly connected to a generally triangular cam plate 64 of a cam assembly C such that cam plate 64 rotates in response to rotation of drive shaft 62. Valve shaft 28 is connected to a first link member 66 for rotational movement therewith while valve shaft 30 is connected to a second link member 68 for rotation movement therewith. Cam assembly C further includes a first cam follower 70 which has a cylindrical outer surface and is rotatably journaled on cam plate 64. Cam assembly C also has a second cam follower 72 which has an outer cylindrical surface and which is rotatably journaled on cam plate 64, first and second cam followers 70 and 72 being spaced, as shown, from one another on cam plate 64.

Link members 66 and 68 can generally be considered geneva links and, as shown, have a generally U-shape, first link 66 having a first slot 74, second link member 68 having a second slot 76. Slot 74 has a first portion adjacent the mouth of slot 74 defined by first and second, opposed, arcuate surfaces 78 and 80. Contiguous arcuate side surface 78 and further defining slot 74 is a substantially straight side surface 82 while contiguous arcuate side surface 80 is a substantially straight side surface 84, side surfaces 82 and 84 being substantially parallel to one another. Likewise, second slot 76 is defined by opposed, arcuate side surfaces 86 and 88, arcuate side surface 86 being contiguous a substantially straight side surface 90, arcuate surface 88 being contiguous a substantially straight side surface 90, side surfaces 90 and 92 being substantially parallel to one another.

Arcuate surfaces 78, 80, 86 and 88 all form circular arcs. In the position shown in FIGS. 3 and 5, the radius of curvature of surfaces 86 and 80 are concentric with the radius of curvature around the fixed axis 62 defined by shaft about which cam plate 64 rotates. Parallel side surface 82 forms a first cam surface on link member 66 while parallel side surface 84 forms a second cam surface on link member 66. Parallel side surface 92 forms a third cam surface on link member 68 while parallel side surface 90 forms a fourth cam surface on link member 68.

Also attached to cam plate 64 is bowden cable 46, bowden cable 46 being slidably mounted in brackets 100 and 102 secured to cover plate 54 and is pivotally connected to cam plate 64 by means of pivot connection 104.

Figure 5:
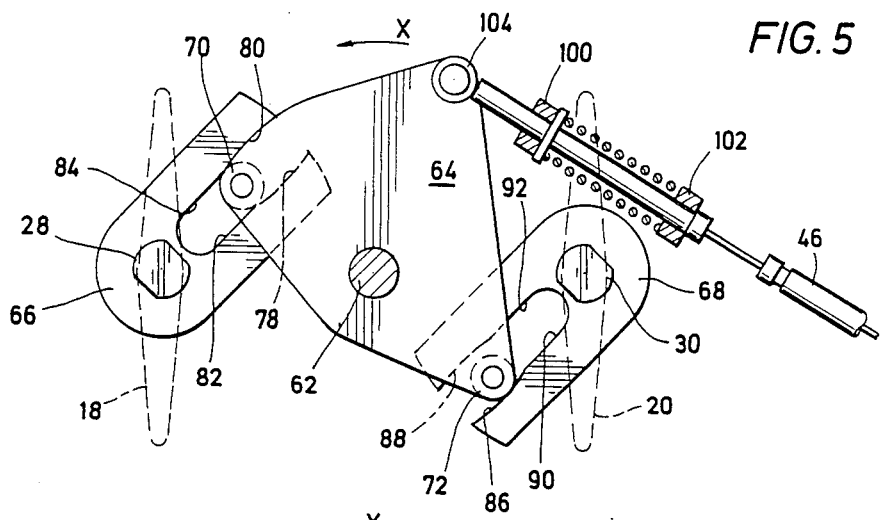
FIGS. 5-9 are top planar views of the transmission assembly shown in FIG. 3 depicting the movement of the block valves from the fully closed to the fully opened position.
Figure 6:
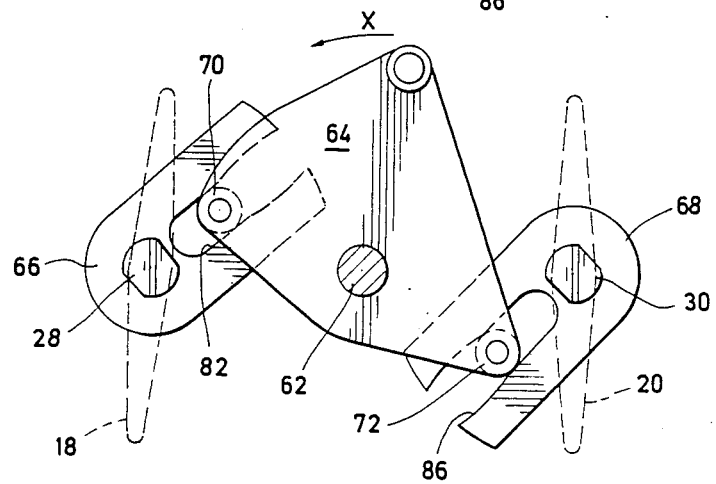

Referring now to FIG. 5 which shows the position of the cam plate 64 rotated approximately 15° from the position shown in FIG. 3, it can be seen that the valves 14 and 16 and hence disks 18 and 20 are still in the fully closed position. In other words, the cam followers 70 and 72 have moved in a lost motion path along the surfaces 80 and 86 respectively, as cam plate 64 has rotated from the position shown in FIG. 3 to the position shown in FIG. 5. Accordingly, no movement of link members 66 or 68 has occurred. Any further rotation of shaft 62 by means of actuator A in the direction shown by arrow X will result in rotation of cam plate 64 in the direction shown by arrow X. It can be seen that in the position shown in FIG. 5, first cam follower 70 is just at the point of engagement with side surface 82. Accordingly, any further movement of cam plate 64 in the direction of arrow X will cause link 66 to rotate around the axis determined by shaft 28 in a clockwise direction. This is graphically shown in FIG. 6 where cam plate 64 has rotated, cam follower 70 engaging the first cam surface formed by parallel side surface 82. It will be observed that although disk 18 has now moved from the fully closed position to a partially open position in FIG. 6, disk 20 is still in the fully closed position. This occurs because cam follower 72 has been moving on arcuate surface 86 which, since it is a circular arc having a concentric radius of curvature to the radius of curvature around shaft 62 results in lost motion to the extent that no movement of link member 68 occurs.

Figure 7:
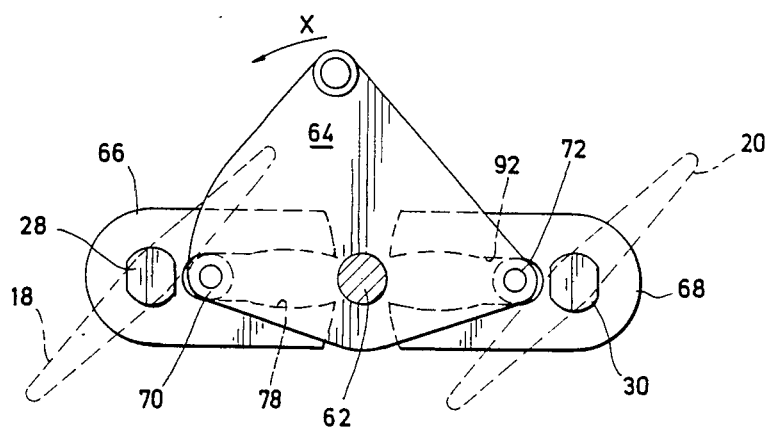

Referring now to FIG. 7, further movement of cam plate 64 results in cam follower 70 continuing to move along surface 82 with resultant further clockwise rotation of link member 66 and hence further opening of valve disk 18. Likewise, cam follower 72 is no longer on the lost motion path defined by arcuate surface 86 but rather has engaged side surface 92 thereby forcing link member 68 to also rotate in a clockwise direction. The rotation of link member 68, of course, results in rotation of disk 20 into the partially open position shown in FIG. 7. It will be observed that the lost motion that occurs between cam follower 72 and link member 68 permits valve disk 18 to be cracked open just before valve disk 20 is cracked open. Accordingly, torquing requirements are reduced and actuator sizing can be downgraded since it is not necessary to disengage both disks 18 and 20 from their tight, interference fit with the valve seat at the same time.

It will be appreciated that by varying the lost motion path along which cam follower 72 travels, the time differential between when disk 18 opens and disk 20 opens can be varied. In other words, if disk 18 commences opening at time $t_0$, when cam follower 70 has just engaged the first cam surface formed by parallel side surface 82, disk 20 will open at a time $t_1$ where $t_0-t_1$ equals the time between when cam follower 72 engages surface 92 and cam follower 72 traverse the lost motion path and engages the cam surface formed by parallel side surface 92. In the closing mode, the time differential can likewise be varied.

Figure 8:
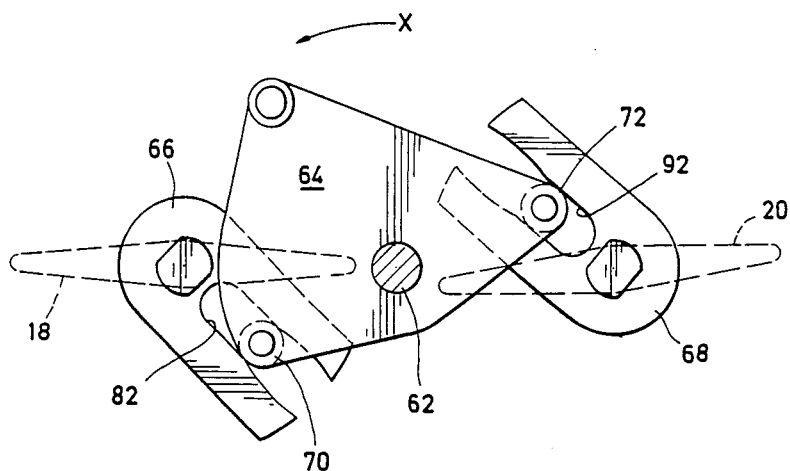
Figure 9:
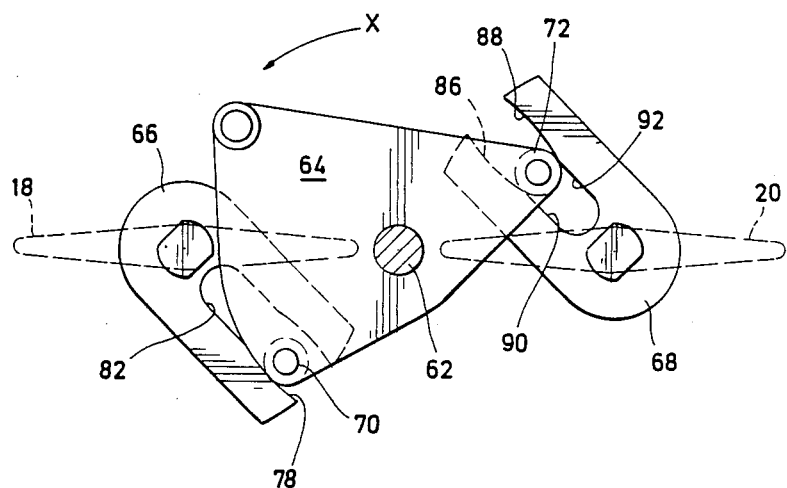

FIGS. 8 and 9 depict further rotational movement of cam plate 64 in the direction of arrow X and hence further clockwise movement of link members 66 and 68 in response to engagement of cam follower 70 with surface 82 and cam follower 72 with surface 92. With particular reference to FIG. 9, it can be seen that valve disks 18 and 20 are shown in the fully opened position. It will thus be seen that as cam plate 64 rotates between the position shown in FIG. 5 and the position shown in FIG. 9, cam follower 70 engages a cam surface defined by parallel side surface 82 whereas cam follower 72 engages a cam surface defined by parallel side surface 92. Thus, cam follower 72 first moves along a lost motion path defined by arcuate surface 86 prior to engaging the cam surface defined by parallel side surface 92.

When it is desired to now close valves 14 and 16, i.e. move disks 18 and 20 to the fully closed position shown in FIG. 5, rotation of cam plate 64 is reversed from the direction shown by arrow X and the process is reversed. It will now be appreciated that second link member 68 will be moved first, i.e. disk 20 will move toward the closed position initially. Disk 18 will not begin to move until cam follower 72 has engaged parallel side surface 90 forming the second cam surface. In other words, the initial movement by link member 68 is not realized in link member 66 since cam follower 70 is moving on a lost motion path defined by arcuate surface 78, i.e. in the position shown in FIG. 9, arcuate surface 78 has a radius of curvature equal to a radius of curvature around the axis determined by shaft 62. It will thus be appreciated that as the valves 14, 16 move to the closed position as shown in FIG. 5, disk 20 will be in the fully closed position first followed by the closing of valve disk 18.

As noted above, in the position shown in FIG. 3 with both valves 14 and 16 closed, bleed valve 38 would normally be in the opened position. The movement of cam plate 64 about 15°, i.e. to the position shown in FIG. 5, will cause bleed valve 38 to be moved from the fully opened to the fully closed position as cam plate 64 moves from the position shown in FIG. 3 to the position shown in FIG. 5. Thus, the block valves 14, 16 will be sequenced to open and close one after the other and at the same time bleed valve 38 will be sequenced to move from the opened to the closed position all by virtue of the rotation of cam plate 64.

Referring now to FIGS. 10–15, there is shown a modified form of the transmission assembly of the present invention for use with larger valves than those shown in FIGS. 5–9. The cam assembly C1 includes a cam plate 110 affixed to and rotatable with drive shaft 62, drive shaft 62 defining a fixed axis about which cam plate 110 rotates. The cam assembly C1 further includes a first cam follower 114 rotatably journaled on cam plate 110 and a second cam follower 116 spaced from cam follower 114 and also rotatably journaled on cam plate 110. As in the case with the previous embodiment, cam followers 114 and 116 have cylindrical outer surfaces. First link member 118 is attached to the shaft 120 of a valve (not shown) and having a valve disk 122 so as to be rotatable with shaft 120. Second link member 124 is likewise affixed to a shaft 126 of a second block valve (not shown) provided with a valve disk 128 whereby rotation of link member 124 results in rotation of shaft 126 and hence opening and closing of valve disk 128. Link member 118 has a slot 130 having a first portion adjacent to the mouth defined by an arcuate side surface 132 and an opposed, chamfered side surface 134 and a second, contiguous portion defined by first parallel side surface 136 and a second parallel side surface 138. Link 124 has a slot 140 having a first portion adjacent to the mouth of slot 140 defined by an arcuate side surface 142 and an opposed, chamfered side surface 144 and a second, contiguous portion defined by a first parallel side surface 146 and a second parallel side surface 148. In the position shown in FIG. 10, arcuate surface 142 has a circular radius of curvature which is concentric with a radius of curvature around the fixed axis determined by drive shaft 62.

Figure 10:
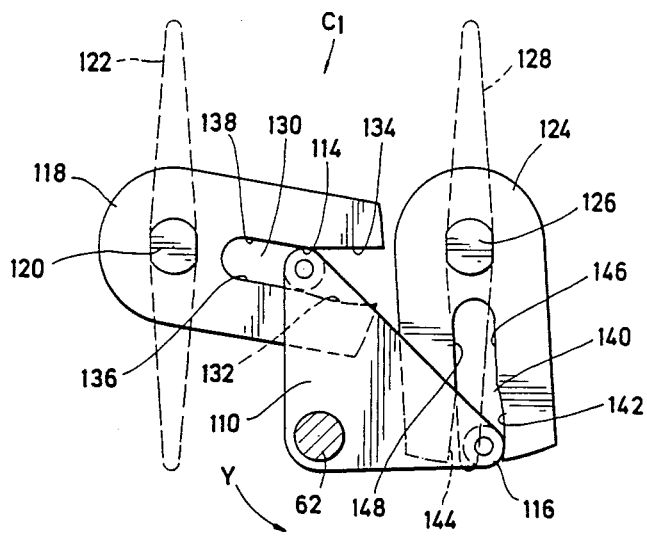
FIGS. 10-15 are views similar to FIG. 5-9 wherein the block valves are of a larger size than those shown in FIGS. 5-9.
Figure 11:
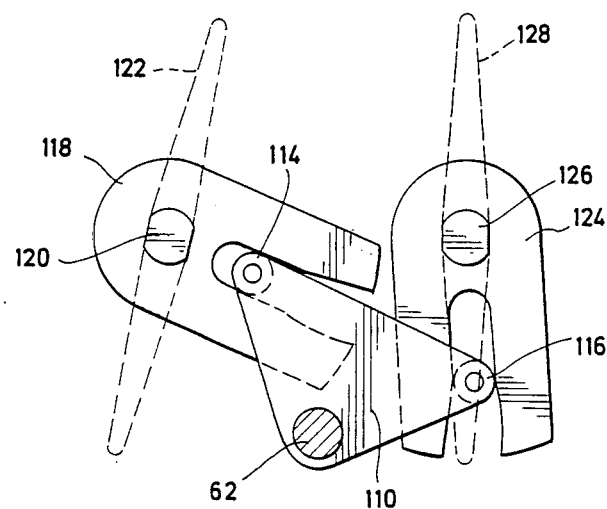
Figure 12:
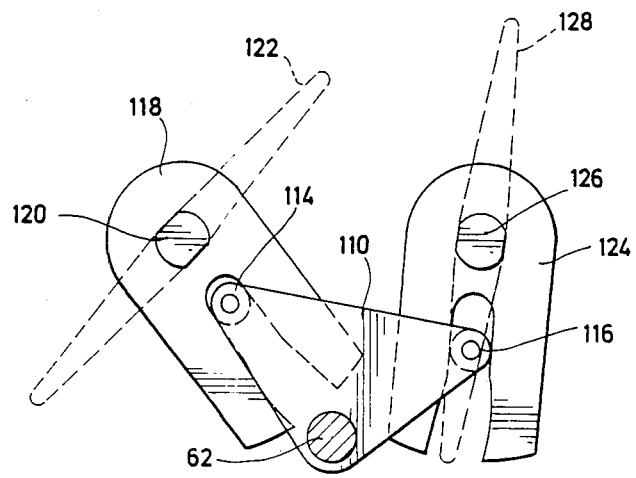
Figure 13:
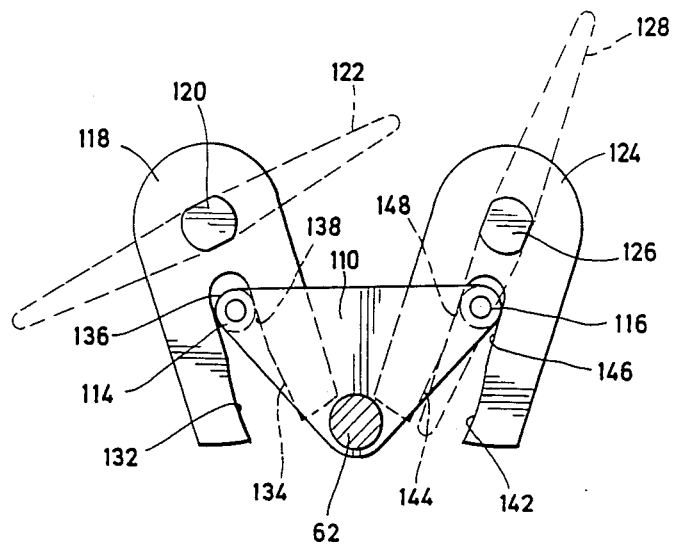
Figure 14:
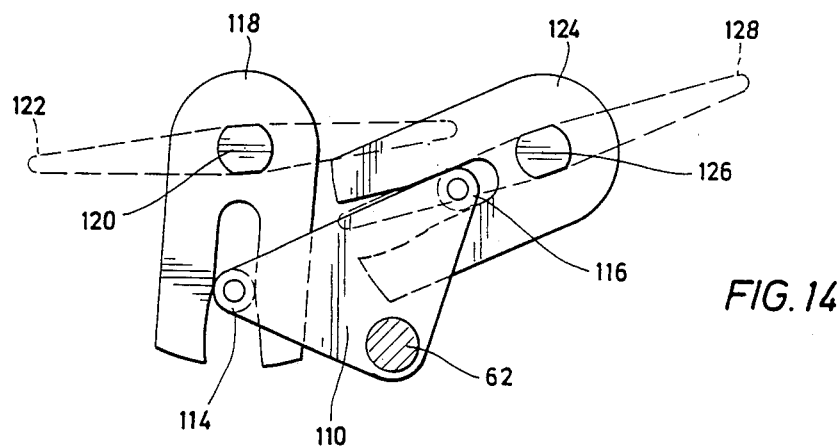
Figure 15:
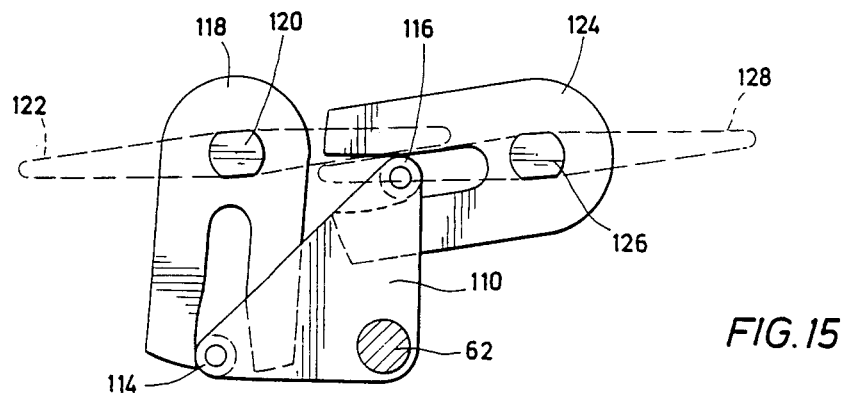
Figure 16:
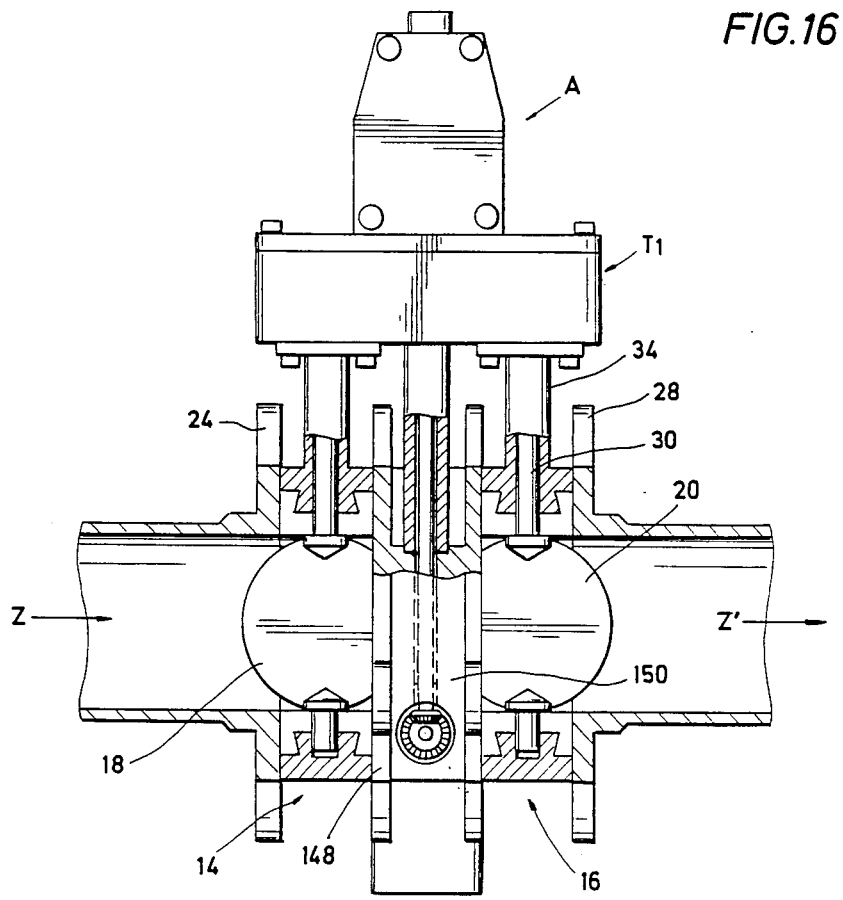
FIG. 16 is a view similar to FIG. 1 showing another embodiment of the transmission assembly of the present invention and showing a modified bleed valve.
Figure 17:
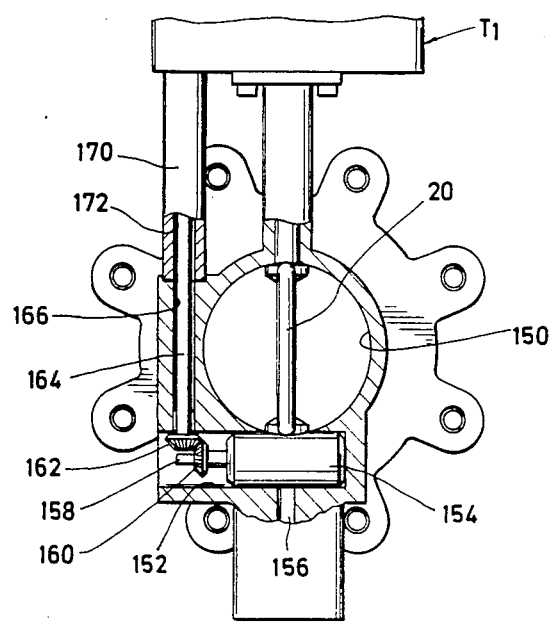
FIG. 17 is an elevational view, partly in section, showing the connection between the bleed valve and the transmission assembly shown in FIG. 4.

FIG. 10 depicts the condition in which both of the block valves having valve disks 122 and 128 are in the fully closed position, whereas FIG. 15 shows the valves in the fully open position. It can be seen that as cam plate 110 rotates counterclockwise in the direction shown by arrow Y, link members 118 and 124 will be caused to rotate in a clockwise direction.

In the fully closed position as depicted in FIG. 10, cam follower 114 is at the juncture between the first portion and the second portion of slot 130 i.e. at the point where any counterclockwise movement of cam plate 110 will bring cam follower 114 into engagement with parallel side surface 136 and effect movement of link 118. However, as explained above, no movement of link 124 occurs in this initial period since cam follower 116 is traversing a lost motion path defined by arcuate surface 142. It is not until cam plate 110 has been moved sufficiently (see FIG. 11) that cam follower 116 now comes into engagement with parallel side surface 148, and further movement of cam plate 110 in the counterclockwise direction resulting in movement of link 124 in the clockwise direction. Thus, as in the previous case, the first block valve is initially cracked open before the second block valve is cracked open. Continued movement of cam plate 110 in the counterclockwise direction results in full opening of the block valves to the positon shown in FIG. 15. In moving from the position shown in FIG. 10 to the position shown in FIG. 15, cam follower 114 will engage side surface 136 and the lost motion path defined by arcuate surface 132. Cam follower 116 will follow the lost motion path defined by arcuate surface 142 and engage side surface 148. If the direction of cam plate 110 is now reversed so as to move the block valve from the fully open (FIG. 15) to the fully closed (FIG. 10) position, the process will be reversed, i.e. valve disk 128 will initially be moved towards the closed position followed by initial movement of valve disk 122 towards the closed position, the time lag being determined by the length of the lost motion path traversed by cam follower 114, as explained above. Likewise, disk 128 will be moved to the fully closed position just ahead of disk 122.

Referring now to FIGS. 16-21, a double block and bleed system is shown employing a different embodiment of the transmission assembly of the present invention and a modified bleed valve. In the system shown in FIG. 16, an annular body 148 forms a chamber 150 between first and second block valves 14, 16, respectively. Disposed in a cavity 152 formed in body 148 is a rotatable bleed valve element 154, valve element 154 serving to provide open communication between chamber 150 and a drain port 156 whereby chamber 150 can be drained of any fluid contained therein. Although not shown, the double block and bleed system shown in FIG. 16 could also be provided with a suitable CIP assembly such as shown in FIG. 1 so that the interior of chamber 150 could be thoroughly washed with a cleaning solution. Valve element 154 is connected by means of a shaft 158 and meshed bevel gears 160 and 162 to a rotatable shaft 164 whereby any rotation of shaft 164 will be transmitted through gears 160 and 162 to shaft 158 resulting in rotation of bleed valve 154. Shaft 164 extends through a bore 166 formed in body 148 which in turn is fitted with a neck 170 having a bore 172 through which shaft 164 extends. Neck 170 is also received in a counterbore in the bottom wall 174 of transmission assembly T1, the counterbore being in register with a bore passing through bottom wall 174 to the interior of transmission assembly T1. Shaft 164 is connected by a coupling 176 to a shaft 178 which extends through the bore in the bottom wall 174 of transmission assembly T1, the end of shaft 178 projecting into transmission assembly T1 having affixed thereto a bevel gear 180. Bevel gear 180 meshes with a second bevel gear 182 which is affixed to a rotatable gear shaft 184 journaled for rotation at right angles to shaft 178 by means of a mounting bracket 186 secured to the bottom wall 174 of transmission assembly T1 and a bore 188 formed in a side wall of the housing 190 forming transmission assembly T1. Actuator A is mounted atop transmission assembly T1, drive shaft 62 extending through a bore 194 in cover plate 196 of transmission assembly T1. Drive shaft 62 is fixedly secured to cam plate 198 disposed in transmission assembly T1 and forms a fixed axis about which cam plate 198 rotates. Valve shaft 28 is attached to link member 200 for rotational movement therewith while valve shaft 30 is attached to a link member 202 for rotation movement therewith. The cam assembly C2 further includes a first cam follower 204 which has a cylindrical outer surface and is rotatably journaled in cam plate 198. Cam assembly C2 further includes a second cam follower 206 which is rotatably journaled on cam plate 198, cam follower 206 likewise having an outer cyldinrical surface, cam followers 204 and 206 being spaced, as shown from one another on cam plate 198. The operative connection between cam plate 198 and links 200 and 202 and the opening and closing of valves 14 and 16 is substantially as described above with respect to FIGS. 10-15 and hence will not be described in any detail here.

Disposed in transmission assembly T1 is a crank assembly shown generally as 210, crank assembly 210 being mounted for pivotal movement around pin 212 secured to bottom wall 174, pin 212 forming a fixed axis about which crank assembly 210 rotates. Secured to gear shaft 184 for rotational movement therewith is an arm 214, arm 214 being pivotally secured to a link 216 which in turn is pivotally secured to an arm portion 218 of crank assembly 210 by means of a pivot connection 220 attached to arm portion 218.

Figure 18:
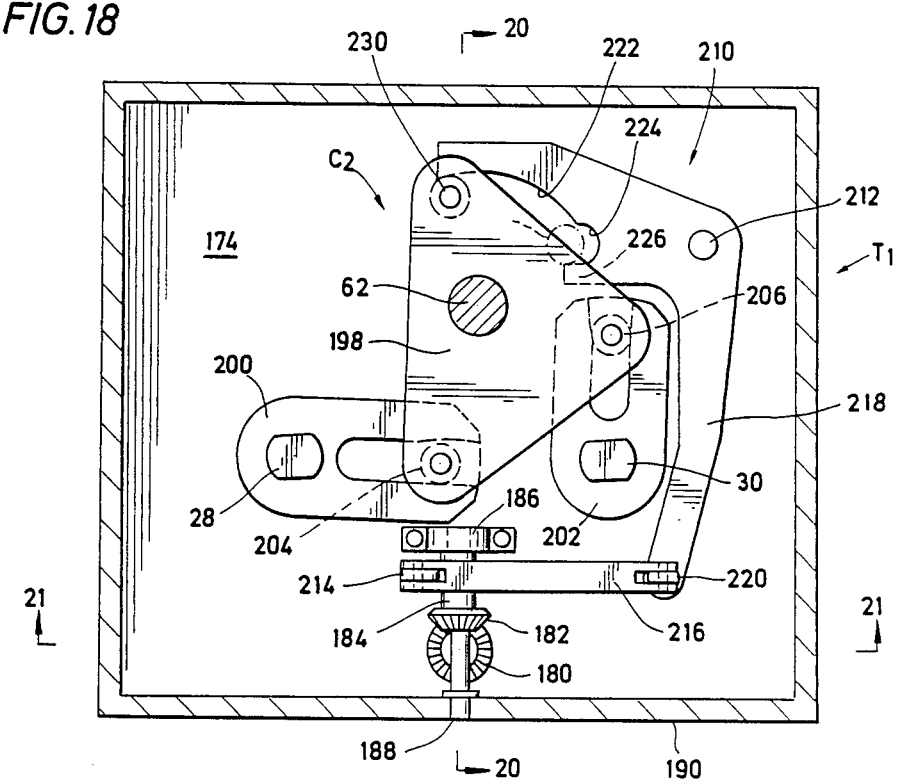
FIG. 18 is a view similar to FIG. 5 showing another embodiment of the transmission assembly of the present invention with the block valves in the fully opened position.

Crank assembly 210 also includes an arcuate surface 222 defining a lost motion path, surface 222 having a circular radius of curvature which, in the position shown in FIG. 18, is concentric with a radius of curvature around an axis formed by shaft 62 about which cam plate 198 rotates. Surface 222 terminates in a recess 224 which is partially formed by a projection 226 forming an engagement surface 228 for a purpose described hereafter. Mounted on cam plate 198 of cam assembly C2 is a third cam follower 230 which is rotatably journaled on cam plate 198 and which also has a cylindrical outer surface. In the position shown in FIG. 18 wherein both of the block valves 14, 16 are in the opened position, cam follower 230 is substantially at a terminal position of the lost motion path defined by surface 222.

Figure 19:
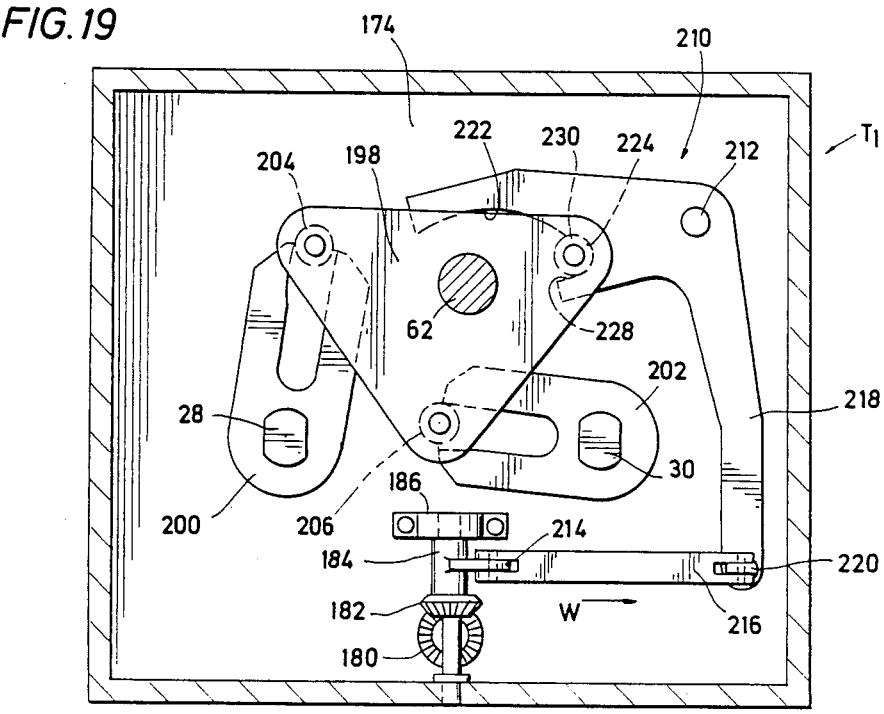
FIG. 19 is a view showing the transmission assembly of FIG. 18 with the block valves in the fully closed position.
Figure 20:
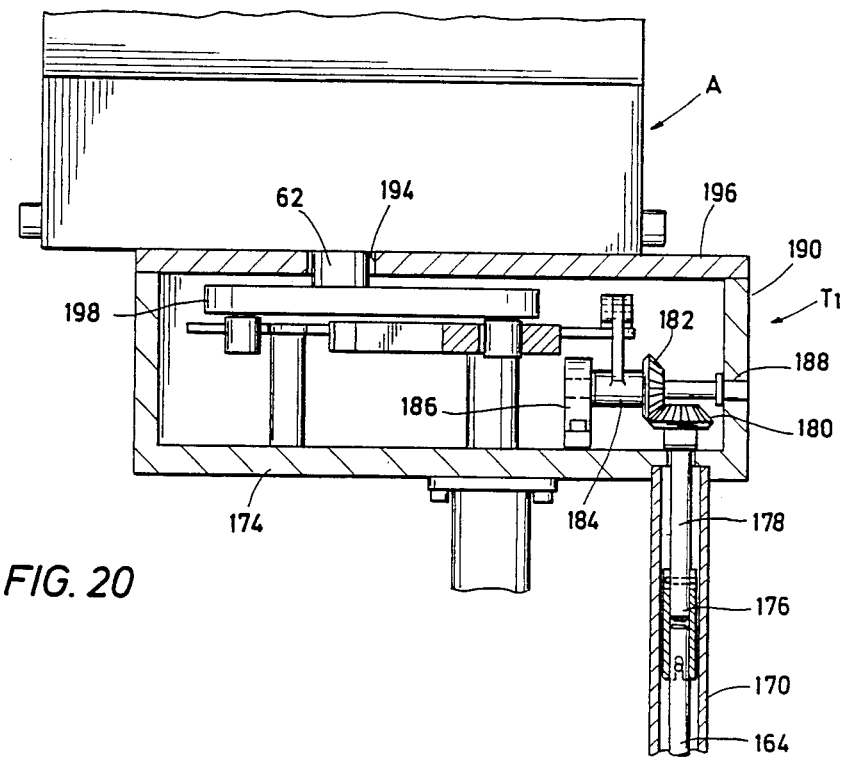
FIG. 20 is a view taken along the lines 20—20 of FIG. 18.
Figure 21:
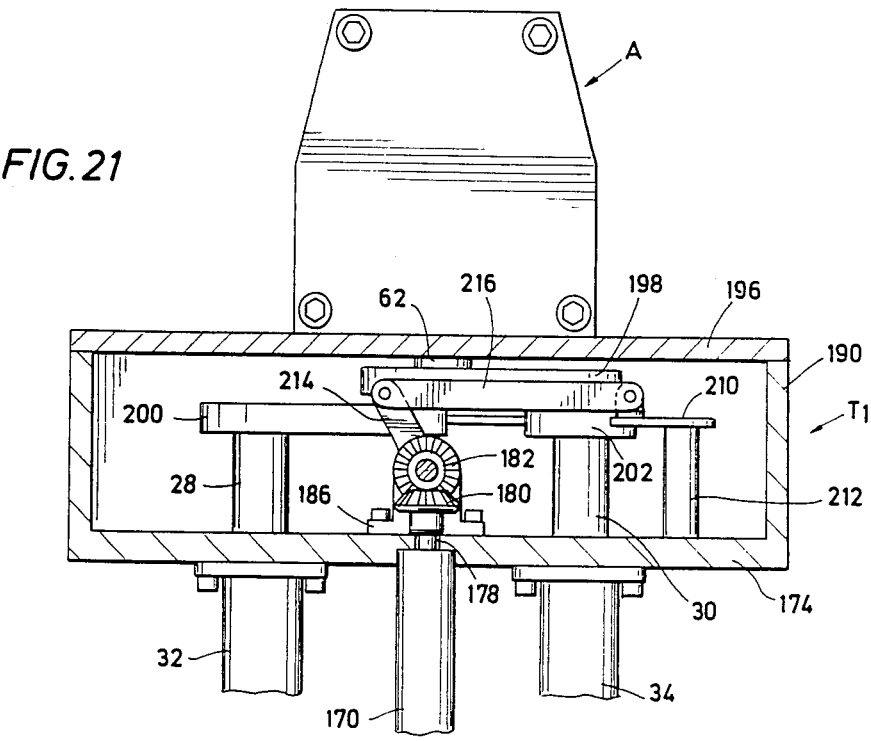
FIG. 21 is a view taken along the lines 21—21 of FIG. 18.

It can be seen that if cam plate 198 is rotated in a clockwise direction, third cam follower 230 will follow the lost motion path defined by surface 222 and crank assembly 210 will remain stationary until cam follower 230 reaches a second terminal position along the lost motion path defined by surface 222 at which point cam follower 230 will engage engagement surface 228 formed on projection 226. Further rotation of cam plate 198 in the clockwise direction will now rotate cam assembly 210 in a counterclockwise direction around axis 212. This in turn will result in the movement of link member 216 in the direction shown by arrow W. As cam plate 198 continues to rotate, cam follower 230 will move along engagement surface 228 until it is received in recesss 224 at which point block valves 14 and 16 will now be in the fully closed position as shown in FIG. 19. In other words, once cam follower 230 engages engagement surface 228 continued rotational movement of cam plate 198 results in rotational movement of cam assembly 210 and hence linear movement of link member 216 in the direction shown by arrow W which will result in rotational movement of shaft 184 connected to gear 182. Gear 182 will in turn rotate gear 180, shaft 178, shaft 164 and ultimately gears 162, 160 which will in turn effect rotation of valve element 154. Thus, as the block valves 14, 16 are moved from the fully opened to the fully closed position, bleed valve 154 will be moved into the fully opened position by the above-described action.

If the process is now reversed i.e. the block valves 14 and 16 are now moved to the opened position, cam follower 230 will now be forced out of recess 224 and in doing so will rotate crank assembly 210 in a clockwise direction thereby moving bleed valve 154 back into a closed position when crank assembly 210 has been turned to the position shown in FIG. 18. It will be appreciated that in this embodiment as in the previously described embodiments, the block valves will be sequentially moved from their initial closed position. Likewise, when the block valves are moved from the closed to the open positions, block valve 14 will commence initial opening motion prior to initial opening movement of block valve 16.

Referring now to FIGS. 22-25, there is shown another embodiment of a means to operate the bleed valve. Cam plate 300 which is affixed to actuator drive shaft 62 for rotation therewith has affixed thereto a rod member 302, rod member 302 being secured to cam plate 300 by a bracket 304. As can be seen, rod member 302 has an end portion 306 which projects beyond the outer periphery of cam plate 300.

Bevel gear 182 is attached to a gear shaft 308 which is rotatably journaled in a bracket 310 secured to the bottom 312 of transmission assembly T2. The gear shaft 308 has a reduced diameter portion 314 which is journaled in the bore 316 in a side wall 318 of transmission assembly T2. Attached to a reduced diameter portion 320 of gear shaft 308 for rotation therewith is a U-shaped member 322 having a receiving slot 324. It will be appreciated that if any force is applied to U-shaped member 322 to result in rotation of gear shaft 308, shaft 178 and hence the bleed valve 154 will be caused to rotate in response thereto as described with respect to the embodiment shown in FIGS. 18-21.

Figure 22:
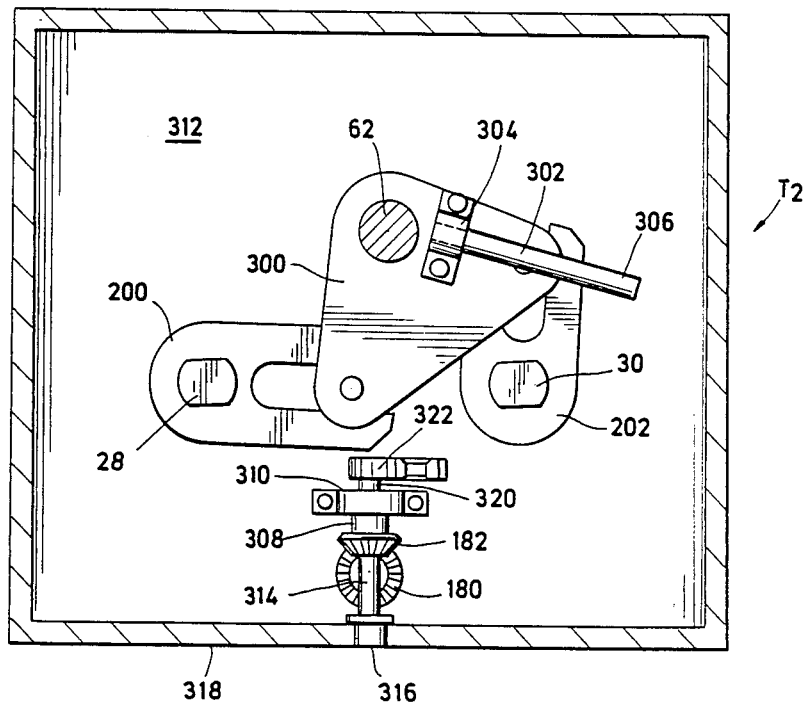
FIG. 22 is a view similar to FIG. 18 showing yet another embodiment of the transmission assembly of the present invention with the block valves in the fully opened position.
Figure 23:
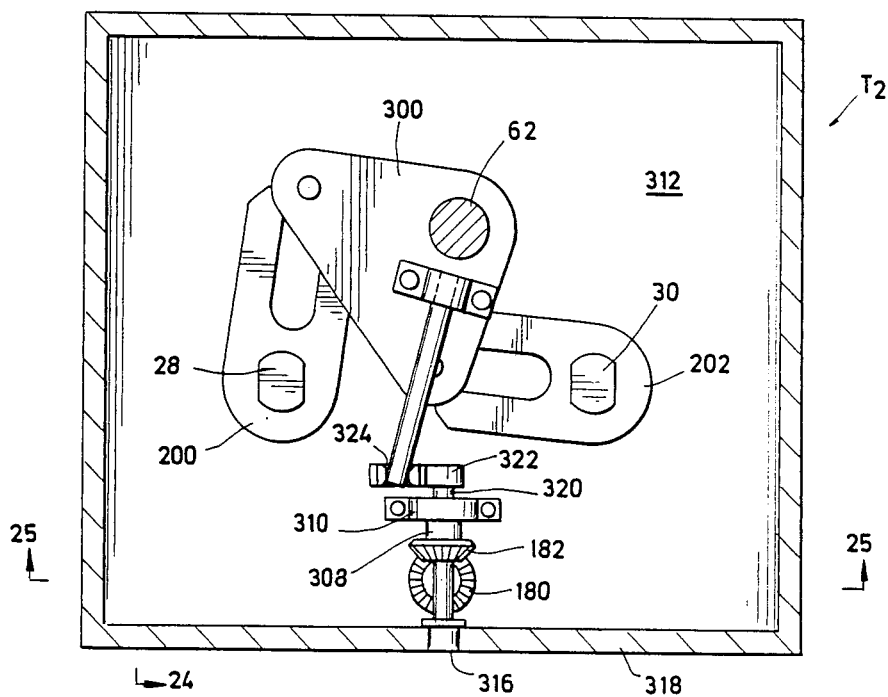
FIG. 23 is a view showing the transmission assembly of FIG. 22 with the block valves in the fully closed position.
Figure 24:
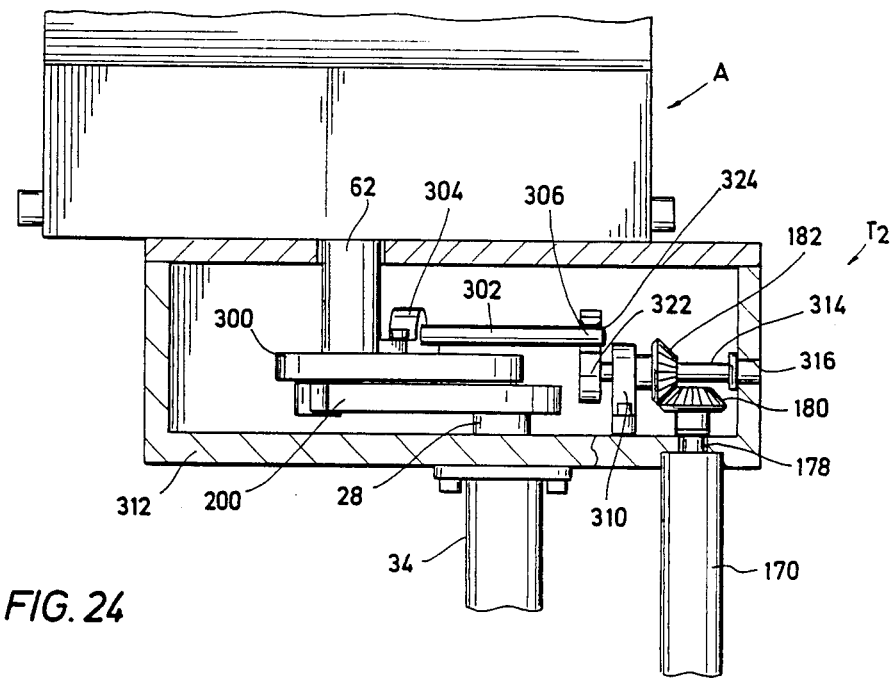
FIG. 24 is a view taken along the lines 24—24 of FIG. 23.
Figure 25:
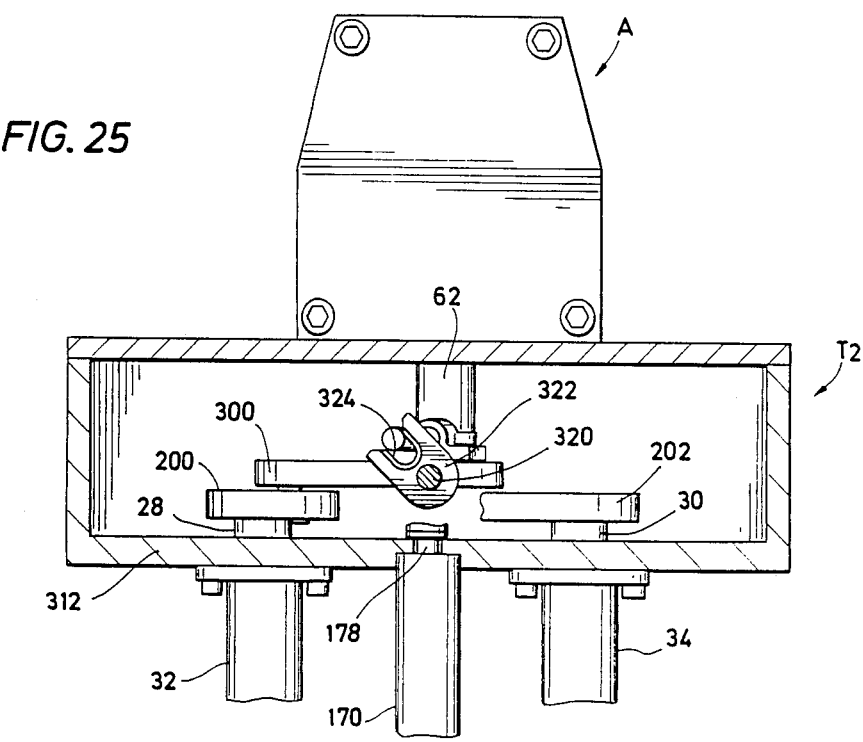
FIG. 25 is a view taken along the lines 25—25 of FIG. 23.

In the position shown in FIG. 22, the valves 14 and 16 are in the fully opened position. Once actuator A is energized, drive shaft 62 will begin to rotate in a clockwise direction resulting in a clockwise rotation of cam plate 300. As cam plate 300 continues to rotate, the end 306 of rod member 302 will engage the slot 324 in U-shaped member 322. Further continued rotation of cam plate 300 will result in rotation of U-shaped member 322 around the axis defined by gear shaft 308 with the result that the bleed valve will be opened or closed depending upon the direction of rotation. As can be seen, in the embodiment shown in FIGS. 22-25, the means to operate the bleed valve does not involve a rotatable cam follower attached to cam plate 300 but rather relies on the lost motion between the position of rod member 302 shown in FIG. 22 to the position of rod member 302 when cam plate 300 has rotated to the point where the end 306 of rod member 302 first engages U-shaped member 322 to induce rotation thereof.

As in the previous transmission assemblies described, transmission assembly T2 would sequence the opening of the block valves so that they neither opened nor closed simultaneously. Furthermore, the bleed valve would be synchronized so as to be closed when the block valves were in the open position and open when the block valves were in the closed position.

The construction and operation of a suitable bleed valve or CIP assembly which can be used with the transmission assembly of the present invention is described in detail in U.S. patent application Ser. No. 07/246316, filed contemporaneously herewith.

These and other modifications will be suggested to those skilled in the art based upon the above description of the invention. It should be understood that such changes and modifications are fully within the scope and spirit of the present invention, which is not restricted to the particular embodiments described herein.

What is claimed is:

1. A transmission assembly for operating a double block and bleed system having a first block valve having a first valve shaft and a second block valve having a second valve shaft and a bleed valve disposed between said first and second valves comprising:

a cam assembly including a cam plate journaled for rotation around a fixed axis;

first means interconnecting said cam assembly and said first shaft for effecting rotation of said first shaft in response to rotation of said cam plate;

second means interconnecting said cam assembly and said second shaft for effecting rotation of said second shaft in response to rotation of said cam plate;

said first means being operative to effect initial rotation of said first shaft from a first position in response to rotation of said cam plate, said second means being operative to effect initial rotation of said second shaft from a first position in response to further rotation of said cam plate after said initial rotation of said first shaft, said first and second means being operative to rotate said first and second shafts, respectively, to a second position in response to further rotation of said cam plate.

2. The transmission assembly of claim 1 wherein said second means includes means to effect initial rotation of said second shaft from said second position toward said first position in response to rotation of said cam plate and said first means is operative to effect initial rotation of said first shaft from said second position to said first position in response to further rotation of said cam plate after said initial rotation of said second shaft from said second position.

3. The transmission assembly of claim 1 wherein said cam assembly includes first and second, spaced cam followers, said first and second cam followers being rotatably journaled on said cam plate.

4. The transmission assembly of claim 3 wherein said first means includes a first link member, said first link member being secured to said first shaft for rotation therewith, said first link member including a first slot for receiving said first cam follower and said second means includes a second link member secured to said second shaft for rotation therewith, said second link member including a second slot for receiving said second cam follower.

5. The transmission assembly of claim 4 wherein said first link member has a first position corresponding to the first position of said first shaft and a second position corresponding to the second position of said first shaft and said second link member has a first position corresponding to the first position of said second shaft and a second position corresponding to the second position of said second shaft.

6. The transmission assembly of claim 5 wherein said first slot has a first portion defining a lost motion path and a second contiguous portion defining an engagement path, said first cam follower being disposed substantially at the juncture between said first and second portions when said first link member is in said first position, said second cam follower being received in said first portion of said second link member when said second link member is in said first position.

7. The transmission assembly of claim 6 wherein said first portion of said first slot is defined by an arcuate side surface and an opposed side surface and said second portion of said first slot is defined by substantially parallel side surfaces and said first portion of said second slot is defined by an arcuate side surface and an opposed side surface and said second portion of said second slot is defined by substantially parallel side surfaces.

8. The transmission assembly of claim 7 wherein one of said parallel side surfaces defining said first slot forms a first cam surface, the other of said parallel side surfaces defining said first slot forming a second cam surface, one of said parallel side surfaces defining said second slot forming a third cam surface and the other of said parallel side surfaces defining said second slot forming a fourth cam surface.

9. The transmission assembly of claim 8 wherein said arcuate side surface defining said first slot has a circular radius of curvature which is concentric with the radius of curvature around said fixed axis when said first link member is in said first position and said first and second cam followers have a cylindrical outer surface.

10. The transmission assembly of claim 8 wherein said first cam follower follows said first cam surface and said second cam follower follows said third cam surface as said first and second link members are moved from said first to said second position, said first cam follower following said second cam surface and said second cam follower following said fourth cam surface as said first and second link members are moved from said second to said first position.

11. The transmission assembly of claim 1 including means attached to said cam plate for operating said bleed valve in response to rotation of said cam plate, said first and second block valves being in the closed position when said first and second valve shafts are in said first position, said first and second block valves being in the open position when said first and second valve shafts are in the second position, and means for operating said bleed valve including means to sequence closing of said bleed valve as said first and second shafts are moved from said first to said second position and opening of said bleed valve as said first and second shafts are moved from said second to said first position.

12. The transmission assembly of claim 11 wherein said means to operate said bleed valve comprises a bowden cable, said bowden cable having one end connected to said cam plate.

13. The transmission assembly of claim 11 wherein said means to operate said bleed valve comprises a crank means journaled for rotational movement about a fixed crank axis, said crank means including a cam engagement surface engageable by a third cam follower mounted on said cam plate, means on said crank means defining a lost motion path between an initial position of said third cam follower and a secondary position of said third cam follower, said third cam follower engaging said cam engagement surface in said secondary position, said third cam follower effecting rotation of said crank means about said fixed crank axis in response to rotation of said cam plate when said third cam follower engages said engagement surface, said crank means being operatively connected to a rotatable shaft means, said rotable shaft means being operatively connected to said bleed valve whereby rotational movement of said crank means effects rotation of said rotational shaft means and opening of said bleed valve.

14. The transmission assembly of claim 13 wherein said means defining said lost motion path is defined by an arcuate surface on said crank means, said arcuate surface having a radius of curvature concentric with the radius of curvature of said fixed axis, said third follower being journaled for rotation on said cam plate and having a cylindrical surface engagable with said arcuate surface on said crank means.

15. The transmission assembly of claim 11 wherein said means to operate said bleed valve comprises rod means fixedly secured to said cam plate, a rotatable shaft means operatively connected to said bleed valve means, means carried by said rotatable shaft means for rotation therewith and defining a receiving formation for receiving said rod means, said means defining said receiving formation being movable between first terminal and second terminal positions when said rod means is received in said receiving formation in response to rotation of said cam plate and said valve shafts are moved from said first to said second positions.

* * * * *